United States Patent Office 3,358,049
Patented Dec. 12, 1967

3,358,049
TREATMENT OF AROMATIC EXTRACTS
Norbert Schneider, Hamburg-Wilhelmsburg, Germany, assignor to The British Petroleum Company Limited, London, England, a British joint-stock corporation
No Drawing. Filed July 9, 1963, Ser. No. 293,905
Claims priority, application Germany, July 11, 1962, O 8,854
8 Claims. (Cl. 260—674)

The present invention relates to a process for the treatment of extracts rich in aromatics obtained by the selective solvent extraction of mineral oils. The products obtained are suitable for special uses because of their particular properties, for example their heat stability and resistant to radiation.

For many uses, especially in lubrication technology, it is necessary to free distillate oils to a large extent from aromatic compounds, principally in order to improve their viscosity/temperature behaviour and also to improve their ageing characteristics. This may be carried out by a process of selective solvent extraction, which provides on the one hand products rich in aromatics which are known as "extracts" and on the other hand the extracted oils which are designated "raffinates."

Crude oils from different sources contain varying quantities of normal paraffinic hydrocarbons which may be a nuisance because of their high solidification point and which may, therefore, have to be removed, for example by known dewaxing processes, either before or after the previously mentioned solvent extraction.

A large number of solvents have already been proposed or have been used for solvent extraction and dewaxing, for example phenol, liquid sulphur dioxide, nitrobenzene and furfural for the former, and ketones, chlorinated hydrocarbons and benzene/sulphur dioxide for the latter. These processes are based on the different solvent capacities of the solvents for the various groups of substances contained in the petroleum fractions. For example, phenol, liquid sulphur dioxide and furfural possess a high solvent capacity for aromatics and a restricted solvent capacity for the other groups of hydrocarbons.

In the process of the present invention, extracts obtained by the selective solvent extraction of mineral oils are used as the initial material, for example extracts obtained by the solvent extraction of low-viscosity (spindle oil) fractions or other machine oil fractions. The extracts consist predominantly of aromatic hydrocarbons and in addition may contain more than 10 but less than 50 percent of paraffinic, naphthenic and hydroaromatic hydrocarbons, as well as other alicyclic, aromatic and heterocyclic compounds.

Extracts obtained from solvent extraction processes generally have an undefined and varying composition, as well as various other unfavourable properties, for example their dark colour and high tendency to age.

It is known that such extracts can be improved by refining techniques such as distillation or hydrogen treatment, for example in order to brighten their colour, but these processes only bring about a change in a few individual properties and do not effect this change to an advanced degree.

The present invention provides a process for substantially completely resolving extracts into their constituent groups of substances. The process of the present invention may be employed in conjunction with suitable after-treatments in order to upgrade the separated groups of substances to yield high-grade special products.

According to the present invention the process comprises mixing an extract rich in aromatics, and obtained by the selective solvent extraction of a mineral oil, with a solvent selective for aromatics, subjecting the mixture to a low temperature crystallisation step, warming the suspension to a point at which all precipitated material melts in such manner that two liquid layers are formed and separating the liquid layers.

It has previously been proposed in the co-pending U.K. patent application No. 26238/62 filed July 9, 1962, and in its corresponding U.S. application Serial No. 211,384, filed July 20, 1962 by Norbert Schneider (now U.S. Patent No. 3,249,531, granted May 3, 1966) to subject a mixture of an aromatic extract and a solvent to a low temperature crystallisation step and to remove precipitated material by filtration. By operating according to the present invention, however, a better separation is obtained more economically.

Whereas in selective solvent extraction processes aromatics are dissolved out because of their good solubility, for example, in furfural, according to the process of the present invention separation is achieved by fractional crystallisation. This is carried out by using solvents having polarities different to the materials being separated and whose solidification points are below the particular working temperature, that is, the particular separation end temperature, employed, in conjunction with suitable low temperatures of preferably —20° C. and below. The fractions obtained may be subjected if desired to a hydrogenation step and/or to other known refining processes.

In the process of the present invention the extract feedstocks are advantageously subjected to a distillation prior to the fractional crystallisation in order to eliminate high-molecular bituminous products which have a troublesome effect on the fractional crystallisation and which also reduce the purity of the fractions resulting from the separation. The quantity of such heavy material which it is necessary to separate during the distillation increases generally as the molecular weight of the extracts increases, assuming that the required quality of product remains the same. Thus, for example, in the distillation of light machine oil extracts approximately 7% of heavy material is removed, whereas in the distillation of heavy machine oil extracts approximately 11% of heavy material is removed. An alteration in these percentages influences the quality of the fractions obtained by a subsequent fractional crystallisation. When less heavy material is removed, the fractional crystallisation becomes more difficult due to the formation of amorphous precipitates. The distillation is advantageously carried out at absolute pressures of 0.1 to 10 mm. Hg and the end boiling point is set in the case of spindle oil extracts at 270° C. (at 10 mm. Hg) and in the case of light machine oil extracts at 280° C. and in the case of heavier extracts at 330° C. (both at 0.1 mm. Hg). However, it is also possible for the distillation to be carried out at atmospheric pressure.

Table 1 below shows the change in the properties of a light machine oil extract distillate residue as the yield of residue increases.

TABLE 1

| End boiling point fraction II | 286°/0.5 | 284°/0.5 | 275°/0.6 | 268°/0.6 | 260°/0.5 | 255°/0.5 |
|---|---|---|---|---|---|---|
| Percent by weight residue (bituminous fraction) | 2.8 | 4.4 | 5.2 | 5.5 | 6.8 | 10.7 |
| Sulphur, percent | 6.02 | 6.16 | 5.91 | 6.03 | 6.0 | 6.07 |
| RuK., °C | +58.4 | +44.0 | +39.0 | +35.5 | +27.6 | +17.7 |
| Breaking point, °C | +10 | ±0 | −1 | −6 | −19 | −18 |
| Penetration/25° | 90 | 50 | 135 | 182 | | |

The extract distillate fractions intended for the separation may be advantageously dissolved in a solvent having an extractive action and possessing polar properties. Then the mixture is slowly cooled. The first compounds which crystallize out are normal paraffins and iso-paraffins. On further cooling the naphthenes are also crystallised. The suspension is slowly warmed until such a point that all the precipitated paraffins and naphthenes melt. Two liquid layers are formed, a paraffin/naphthene layer and an aromatic layer, which may be separated in known manner, for example by decantation, and subjected individually to distillation to remove the solvent and to the usual refining processes, for example hydrogenation, if desired.

If desired, the precipitation temperature may be controlled so that the paraffins are precipitated and removed by filtration, naphthenes being precipitated later and removed as a liquid layer as described above.

For the purpose of separating the paraffins from the naphthenes and separating the latter once again from the aromatics, polar inorganic or organic solvents are used whose solidification points are below the working temperature of the process. It is also possible to operate with solvent mixtures, for example with a mixture of acetone and low-molecular aliphatic alcohols, especially with methyl alcohol, for example in an amount between 0 and 20%. When doing this, use is made of polarity differences between the individual solvents for the specific separation and definite temperature ranges are employed according to the specification requirements regarding the end point.

The operating temperatures of the separating process are usually higher when using solvent mixtures, which favours the economy of the process. Thus the separation end temperature for heavy machine oil extract distillate when using pure acetone is about −35° C., but if a mixture of 95% acetone and 5% methyl alcohol is employed, suitable products are obtained with a separation end temperature of −20° C. Again, with a mixture of 80% acetone and 20% methyl alcohol, suitable products are obtained at a temperature of 0° C.

The separation end temperature is understood to be the temperature at which the major part of the naphthenic compounds have crystallised out, which can be detected from the values of the refractive index, the density and the saponification value or by an infrared spectrum.

The solvents used are preferably organic substances which can enter into polar exchange action with the compounds to be separated. Suitable solvents include alcohols, aldehydes, ketones, acids, aromatic or hydroaromatic compounds which possess a sufficiently low solidification point whilst at the same time possessing sufficient solvent capacity for aromatics. It has been found that the addition of up to 5% of water has a beneficial influence on the cold separation.

Mixtures of varying composition of acetone/water, acetone/methyl alcohol, ethyl alcohol, propyl alcohol and isopropyl alcohols; acetone/acetic acid; acetone/ethyleneglycol; acetone/benzyl alcohol; acetone/benzaldehyde and benzaldehyde/benzyl alcohol and especially acetone/furfural have been found to be particularly suitable.

The separation of extract distillates into paraffinic, naphthenic and aromatic fractions can be controlled by the use of different solvents and solvent mixtures, by changing the extract/distillate/solvent proportions and by changing the temperatures of separation. By adjustment of the conditions a sharp or less sharp separation of the individual classes of substances can be obtained. Thus, for example, when using pure acetone the proportion of extract distillate to solvent for spindle oil extracts is between 1:2 and 1:20 and that for light and heavy machine oil extract distillates is between 1:2 and 1:15.

The higher the proportion of extract to solvent which is chosen, the purer is the naphthene fraction, which can be seen in an increasing saponification number, a decreasing refractive index, and a decreasing specific gravity, and the more impure becomes the resultant aromatic fractions.

The fractions obtained are preferably subjected to a hydrogenation treatment which may be carried out under varying conditions. As the hydrogenation charge material will generally contain sulphur, it is advantageous to use sulphur-resistant hydrogenation catalysts. Sulphur-resistant hydrogenation catalysts of this kind include the oxides and sulphides of metals of the 6th Group either alone or in admixture with oxides or sulphides of metals of the 2nd and 8th or metals of the 8th Group of the Periodic Table, especially mixtures of molybdenum oxide, zinc oxide, magnesium oxide, nickel sulphide or nickel oxide, the molybdenum sulphides, tungsten sulphides on activated supports, iron sulphides on activated alumina or bauxite or the like.

The hydrogenation temperatures used are preferably between 190° and 400° C. The pressures which are advantageously used are within the range from 20 to 100 atmospheres gauge. It is possible to operate with a fixed-bed catalyst.

During the hydrogenation of the naphthene fractions, which is preferably carried out between 200 and 400° C. and about 20 to 100 atmospheres gauge, it is possible to reduce the sulphur to 0.1% and below and to lighten the colour up to 1.1/2 Union and lighter. Under these temperature conditions types of white oil are obtained from naphthene fractions.

The hydrogenation of the aromatics is advantageously carried out between 250 and 400° C. at about 20 to 90 atmospheres gauge, the sulphur decreasing as the temperature rises.

The aromatic and napthene fractions obtained by hydrogenation may be stripped in a distillation column of the usual construction to a given flashpoint or cut into distinct fractions. The temperature conditions in each case during the distillation will depend to a large extent on the quality requirements which are imposed on the naphthene and aromatic fractions.

It has been found that particularly favourable results are obtained if furfural or SO₂ extracts are used as the initial materials.

Of the products resulting from the separation process according to the present invention, viz. paraffins naphthenes and aromatics, it is possible (1) to further process the paraffins according to known methods and to utilise the solid paraffins, for example like the paraffin products obtained during the normal de-waxing of lubricating oil;

(2) the naphthenes, which behave in principle like naphthenic lubricating oil distillates, can be treated by the ordinary known processes used in the lubricating oil industry. They can be processed by thermal hydrogenation or acid treatment to form detergents, lubricants or base oils. The possibilities extend as far as white oil production.

The processing of naphthenes to form special lubricating oils ensures on the one hand the good economy of the process the present invention as a whole and, on the other hand, signifies an indirect increase in yield of utilisable products occurring during solvent treatment.

After treatment as described below, the aromatics are suitable as:

(a) heat transfer oil
(b) radiation-resistant lubricating oils and lubricant greases, as well as moderator oils or additives for moderator oils of organically moderated nuclear reactors.

Special modes of operation are required for the production of the individual products.

(a) Heat transfer oils can be produced, according to the viscosity required, from spindle oil extracts, light or heavy machine oil extracts. They may be produced from either the aromatic fraction or a mixture of aromatic and naphthene fraction, obtained from the extract separation described. Heat transfer oils with optimum properties are obtained by a mild hydrogenation which improves the thermal stability and the aging behaviour. A similar effect is obtained—although under considerably less favourable conditions as regards economy—by hot treatment with Fuller's earth.
(b) For the production of radiation-resistant base oils, which can be used for the production of radiation-resistant lubricating oils or radiation-resistant greases, the aromatic fractions obtained by the separation described above are preferably employed, because the naphthene fractions generally have too great a tendency to form olefins during irradiation. The aromatic fractions may be subjected to the following treatment:

(1) an acid treatment and/or
(2) a Fuller's earth hot treatment and/or
(3) a hydrogenation.

The yields of aromatics obtained in the process of the present invention are higher than those obtainable by the process of the U.K. co-pending application No. 26238/62 involving filtration. This is illustrated by the following examples:

*Example 1*

In the case of light machine oil extract, the yields when using a working temperature, that is, a separation end temperature, of −20° C. using a solvent mixture of 20% methyl alcohol and 80% acetone with an extract dilution of 1:4 are 44.4% aromatics and 55.6% naphthenes plus paraffins.

The process according to application No. 26238/62 under the same conditions gives a yield of 42% aromatics, 58% naphthenes plus paraffins.

These higher yields, which vary with temperature, are attributed to an increased redissolving of naphthenes in the aromatic solvent phase, which is brought about principally by the de-gassing, that is, the evolution of solvent vapor, during the melting stage, that is, the warming-up stage, and the resultant turbulence. The lower the working temperature, the greater is the degassing when remelting, and the greater is, therefore, the resolution, so that by adjusting the separating temperature the yields of naphthenes and aromatics can be controlled. The lower the working temperature, the higher is the yield of aromatics as compared with the process of application No. 26238/62, under the same process conditions.

*Example 2*

A comparison of the yields at various temperature of the process of the present invention and that of application No. 26238/62 is given in the following table:

TABLE

| | Process of application No. 26238/62 | | Process for the present invention | |
|---|---|---|---|---|
| | Aromatics, percent | Naphthenes, percent | Aromatics, percent | Naphthenes, percent |
| At ±0° C | 56.4 | 43.6 | 56.2 | 43.8 |
| At −10° C | 49.2 | 50.8 | 51.6 | 48.4 |
| At −20° C | 42 | 58 | 44.4 | 55.6 |

I claim:
1. In a method for selective solvent extraction of mineral lubricating oils to obtain a raffinate component and an extract component, said extract component consisting predominantly of aromatics and containing in addition more than 10% but less than 50% of paraffinic, naphthenic and hydro-aromatic hydrocarbons, as well as other alicyclic, aromatic and heterocyclic compounds, the improvement of separating the extract fraction into a fraction consisting of aromatics and at least one other fraction containing naphthenes which comprises adding a solvent selective for aromatics to the said extract component to form a mixture consisting of the solvent and the extract component, said solvent having a solidification point below the separation end temperature of the process at which, when cooled, the major portion of the naphthenic components will crystallize out, cooling the mixture consisting of the extract component and solvent slowly to the separation end temperature to crystallize out by low temperature fractional crystallization at least the major portion of naphthenes, slowly warming the cooled mixture with its content of precipitated material, until all precipitated material melts and two liquid layers are formed, and separating the liquid layers and recovering a fraction consisting essentially of aromatics and at least one other fraction containing naphthenes.

2. A process as claimed in claim 1 wherein the fractional crystallisation is operated at a temperature not higher than −20° C.

3. A process as claimed in claim 1 wherein the separation of paraffins is carried out in an intermediate cooling stage by filtration.

4. A process as claimed in claim 1 wherein the feedstock is first subjected to a distillation step to remove high molecular weight bituminous compounds.

5. A process as claimed in claim 1 wherein the feedstock is an extract obtained by the treatment of a mineral lubricating oil with a solvent selected from furfural and sulphur dioxide.

6. A process as claimed in claim 1 wherein the solvent comprises at least one liquid taken from the group acetone, furfural and low molecular weight alcohols, with from 0–5% of water.

7. A process as claimed in claim 1 wherein the recovered fractions are subjected to a hot treatment with Fuller's earth.

8. A process as claimed in claim 1 wherein the recovered fractions are subjected to a hydrogenation treatment.

References Cited

UNITED STATES PATENTS

| 1,908,018 | 5/1933 | Henderson | 208—334 |
| 3,249,531 | 5/1966 | Schneider | 208—311 |

FOREIGN PATENTS

| 466,980 | 6/1937 | Great Britain. |
| 736,904 | 9/1955 | Great Britain. |

DELBERT E. GANTZ, *Primary Examiner.*

C. E. SPRESSER, *Assistant Examiner.*

UNITED STATES PATENT OFFICE
CERTIFICATE OF CORRECTION

Patent No. 3,358,049  December 12, 1967

Norbert Schneider

It is hereby certified that error appears in the above numbered patent requiring correction and that the said Letters Patent should read as corrected below.

Columns 3 and 4, TABLE 1, seventh column, line 1 thereof, for "255°/0.5" read -- 255°/0.4 --; column 3, line 54, for "infrared" read -- infra-red --; column 4, line 47, for "250 and 400° C." read -- 250 to 400° C. --; column 5, line 2, for "process the" read -- process of the --; line 20, for "fraction" read -- fractions --; line 63, for "resolution" read -- re-solution --; line 70, for "temperature" read -- temperatures --.

Signed and sealed this 11th day of February 1969.

(SEAL)
Attest:

Edward M. Fletcher, Jr.
Attesting Officer

EDWARD J. BRENNER
Commissioner of Patents